United States Patent

Marvin

[15] 3,677,175

[45] July 18, 1972

[54] BALE EJECTOR

[72] Inventor: Neil T. Marvin, Novi, Mich.

[73] Assignee: Bra-Can Industries, Inc., Livonia, Mich.

[22] Filed: April 12, 1971

[21] Appl. No.: 133,141

[52] U.S. Cl. ............................... 100/35, 100/218, 100/295
[51] Int. Cl. ......................................................... B30b 15/32
[58] Field of Search ............... 100/3, 35, 218, 295, 226, 255

[56] References Cited

UNITED STATES PATENTS

| 181,632 | 8/1876 | Brock | 100/218 X |
| 380,088 | 3/1888 | Calder | 100/218 |
| 415,909 | 11/1889 | Hackett | 100/218 |
| 1,040,396 | 10/1912 | Paal | 100/218 |
| 1,162,833 | 12/1915 | Wareham | 100/255 |
| 2,590,649 | 3/1952 | Reichert | 100/218 |
| 2,757,603 | 8/1956 | Wilson et al. | 100/226 |
| 2,848,940 | 8/1958 | Jonsson | 100/255 |
| 3,463,079 | 8/1969 | Corbett | 100/255 X |

Primary Examiner—Billy J. Wilhite
Attorney—Burton & Parker

[57] ABSTRACT

The removal of bales from a baler having a vertically reciprocable press platen and a side opening baling chamber door is effected by passing a lifting cable around the bale while in the chamber and connecting the cable to a bale lifting arm projecting laterally from the compacting platen over and beyond the chamber door opening such that upon raising the platen the bale is swung outwardly from the chamber and upon descent of the platen the bale may be rested on a support outside the chamber.

10 Claims, 8 Drawing Figures

Patented July 18, 1972

INVENTOR.
NEIL T. MARVIN
BY
Burton & Parker
ATTORNEYS

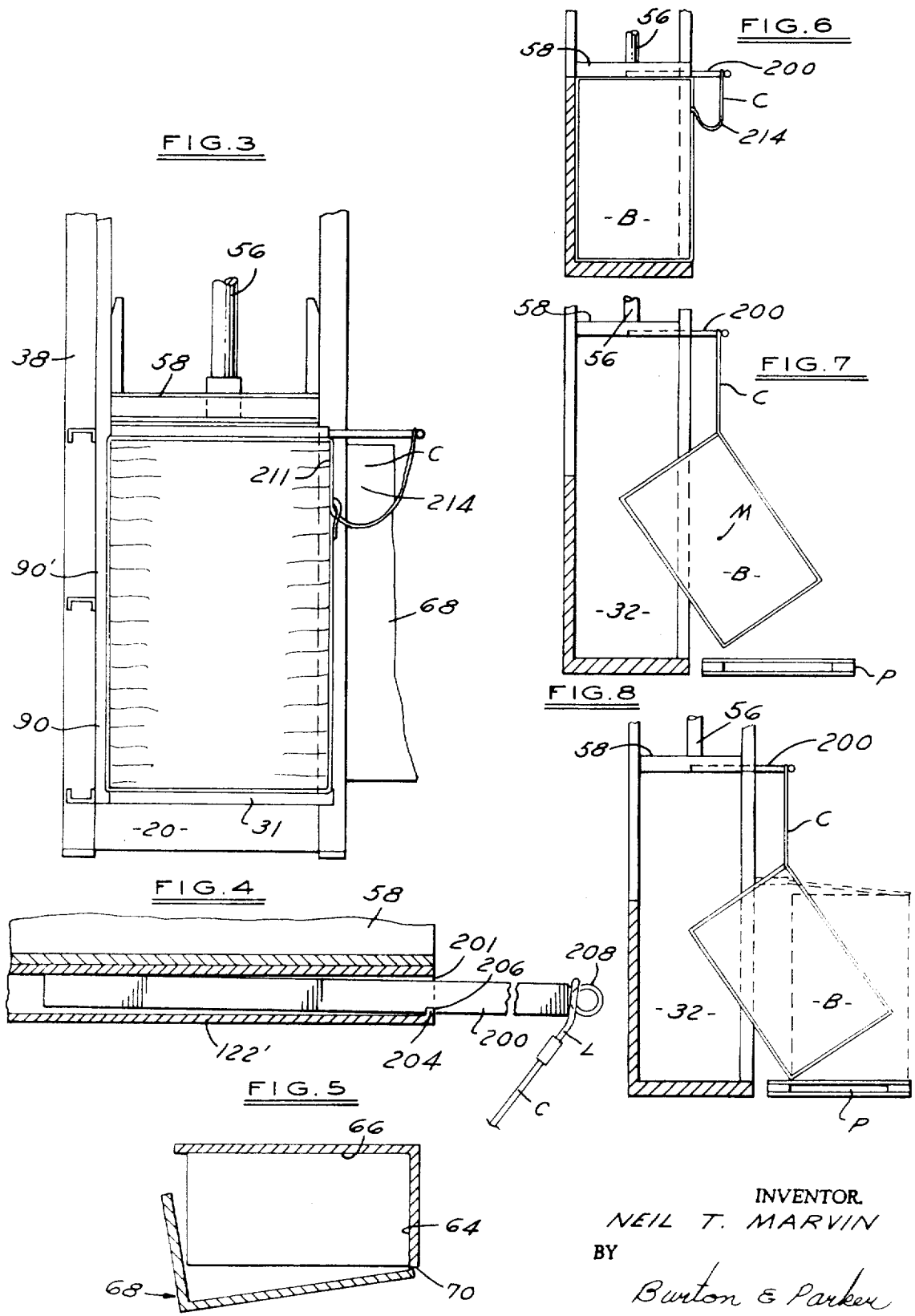

BALE EJECTOR

FIELD OF INVENTION

This invention relates to the removal of formed bales from balers for cardboard boxes, wastepaper and the like and in particular to a method of and apparatus for the removal of formed bales from balers having a vertically reciprocable compacting platen and a side opening door.

RELATED APPLICATION

This application discloses a further improvement in balers of the kind shown in the copending application of Robert W. Considine et al, Ser. No. 132,090 filed Apr. 7, 1971, though it is not limited in its application to such baler per se. Such copending application should be referred to for a more complete disclosure of the details of the baler with which the instant invention may be used.

BACKGROUND OF THE INVENTION

Retail stores, such as supermarkets, have encountered an increasingly serious problem in disposing of shipping cartons in which goods are delivered. The receiving dock and receiving room of such establishments become cluttered with the empty boxes and cartons and the same are thereupon often piled outside in great disarray where they and their packing material contents may become scattered over and disfigure the outlying property. This invention relates to balers particularly well suited for use in such establishments as it enables the wastepaper, cardboard boxes and the like to be reduced in size to compact secure bales which may be stored in a small space until removal from the premises. In said copending application a baler for effecting baling of such cartons and wastepaper is disclosed. However, upon completing the baling operation, difficulty can be experienced by the operator in removing the formed bale from the baling compartment because a bale may weight upwards of 700 pounds or more.

DESCRIPTION OF THE PRIOR ART

Since at least 1915 prior inventors have been wrestling with the problem of removing a formed bale from the baler as evidenced by one prior art device where the baling compartment is formed of cooperating L-shaped doors to keep the finished bale from sticking or binding when removing it from the baler. Though no means are disclosed in such device it may be assumed that the bale was manually pushed or tilted out of the baler. Another prior art device discloses a baler having doors that open to completely expose the bale and would facilitate its removal. Other prior art devices suggest providing a wheeled dolly which forms a portion of the bed and one side wall of the baling compartment to facilitate bale removal by simply withdrawing the dolly from the baler carrying the finished bale with it.

Certain drawbacks of such prior art have continued to make bale removal a problem. In the first two mentioned patents the baler must be situated with substantial space all around so that the door may be swung open and this militates against use in a crowded or small room. Further, considerable manual effort and danger to the workmen is attendant to the manual pushing of the bale out of the baler. A principal drawback of the approach suggested in the latter two patents is the cost of providing the special dolly and the fact that once the dolly is removed from the baler, the baling operation must be interrupted until the dolly is returned to the baler as the dolly is an essential part of the baling chamber. Also, if the bale is to be removed from the dolly either to the floor of the storage area or a pallet, manual removal is all that is contemplated.

SUMMARY OF THE INVENTION

In the invention disclosed herein, the foregoing disadvantages of the prior art are overcome and a number of positive advantages obtained. Space requirements are but half those of the prior art balers as only one side opening door is required. Second, the bale is removed utilizing the power of the baler itself and therefore the manual effort required of the prior art is obviated. Third, the bale is controlled in its removal by the baler, being only assisted and guided by the operator, and therefore the dangers attendant to the manual removal are largely overcome if not eliminated. Fourth, the means for removing the bale is but a fraction of the cost of the prior art removal mechanism of the prior art devices. Fifth, the removal is accomplished in such fashion that the bale may be set on a pallet next to the baler for subsequent removal by a forklift truck. Finally, as soon as the bale is removed, the baler may be quickly readied for further baling operation.

In carrying out the invention, a bale lifting arm or bar is projected from the press platen over and beyond the chamber door opening. If desired the arm may be stored when not in use on or in the platen itself and quickly set up when needed. A sling in the form of a cable or the like is passed around the formed bale in a slip loop arrangement and connected to the end of the arm. The press platen which has up to this time been adjacent the top of the bale is now raised and this will serve to swing the bale upwardly and out of the baling chamber and over the floor area adjacent the baler. Controlled descent of the platen will then rest the bale on the floor or on a pallet outside the baler.

BRIEF DESCRIPTION OF THE DRAWINGS

FIG. 3 is an end view taken in the direction of arrow 3 in FIG. 1;

FIG. 4 is a cross-sectional view taken on the line 4—4 of FIG. 1;

FIG. 5 is a schematic plan view looking down on the baling chamber showing the hinged relation of the side opening door; and FIGS. 6, 7 and 8 are schematic end views looking in the direction of arrow 3 in FIG. 1 showing the steps in removing a bale.

DESCRIPTION OF THE PREFERRED EMBODIMENT

Figure 1:
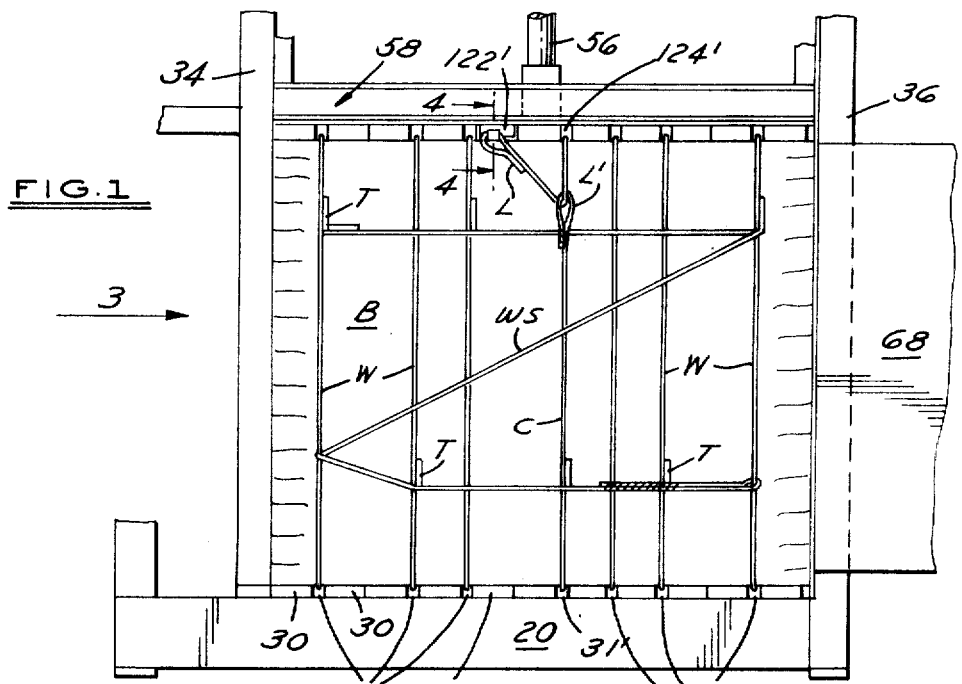
FIG. 1 is a front elevation of a formed bale in the baling chamber of a baler of the type disclosed in said copending application showing the door open and the bale ejecting mechanism in operable position preparatory to removal of the bale from the chamber.

Only as much of the baler itself is shown as is necessary to an understanding of the invention and reference should be made to the aforesaid copending application for further details of a baler with which the invention is particularly, though not exclusively, adapted for use. Reference numerals used herein correspond to reference numerals of such copending application to identify similar structure.

The invention is adapted for use with a baler having a vertically reciprocable press platen 58 which moves into and out of a baling chamber 32 where the bale B is formed. A side opening L-shaped bale removing door 68 is hinged at 70 (see FIG. 5) by offset hinges to an edge of the chamber. In addition to the door the chamber includes a bottom wall or bed formed by a plurality of members 30, some of which are spaced apart to provide baling wire receiving grooves or slots 31, a back wall 66 having vertical baling wire receiving grooves or slots 90 aligned with slots 31, and an end wall 64. Such walls are secured to form upright columns, three of which are shown at 34, 36 and 38 which are rigidly secured to a base 20. To the upper ends of the columns is secured a framework (not shown, but see said copending application) which carries power means such as a fluid pressure ram having a vertically reciprocable piston rod 56, the lower end of which is secured to and carries the press platen 58 for vertical reciprocation above and within the baling chamber. The platen includes a plurality of parallel members 122 some of which are spaced apart to provide baling wire receiving slots or grooves 124 which are aligned with the grooves 90 and 31 in the back wall and bed respectively of the baler.

In the operation of the baler to make up a bale, which is more fully set forth in said copending application, the door 68 is locked closed, the press platen elevated above the upper edge of at least one side of the baling chamber, and the cardboard boxes or the like to be baled are loaded into the chamber. The platen is then moved downwardly into the chamber by the ram to compact the material and then shifted upwardly by the ram to the starting position. This operation is repeated until the chamber is filled with the compacted material. When the chamber is thus filled, the platen is held down firmly against the compacted material, and the door 68 is swung open to expose the side of the bale as in FIGS. 1 and 2. Baling wires W are then inserted in the grooves or slots 31, 90 and 124 and threaded around the compacted material and tied or otherwise secured in front as at T. A diagonal tie wire WS may be secured to the baling wires to prevent endwise dislodgement thereof. The bale is then ready for removal from the baling chamber.

Figure 2:
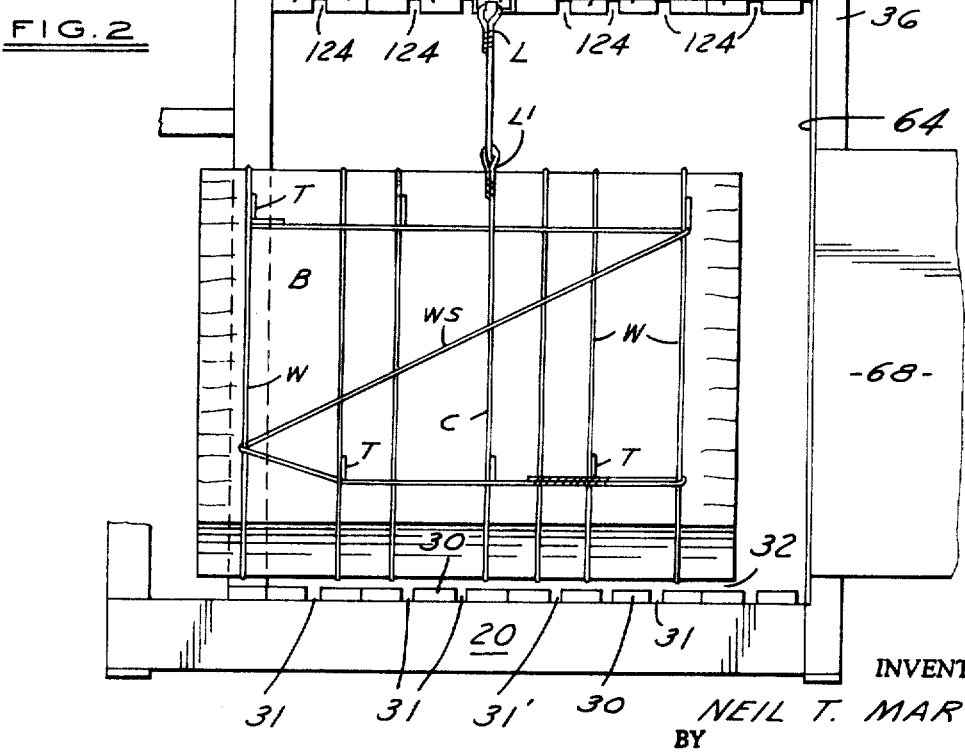
FIG. 2 is similar to FIG. 1 but showing the bale lifted and swung out of the chamber.

The novel arrangement for removing the bale comprises a bale lifting arm or bar 200 mounted for shiftable movement on the platen between an operable position shown in FIGS. 1-4 and 6-8 where it projects laterally from the platen in overhanging relation over and beyond the door opening, and a stored position in which it is shifted to lie within the perimeter or confines of the platen so as not to interfere with the baling chamber door during compacting operation of the baler. In the stored position the lifting arm 200 has been shifted longitudinally back into one of the members 122 to be housed therein. The member in which the arm is housed is indicated at 122' and it will be noted from FIGS. 1 and 2 is offset to the left of the centerline of the baling chamber toward the open end thereof so that the bale will swing to the left away from the end wall 64 of the baling chamber when lifted as shown in FIG. 2. The member 122' comprises a hollow channel having a length sufficient to accommodate the length of the arm 200. The channel is open at 201 and there is an upstanding lip 204 at such open end over which is received a complementary notch 206 in the arm which prevents unintended longitudinal displacement of the arm either during storage or use. The outer end of the arm is provided with a ring 208 which may be welded thereto and serves as a finger hold for grasping the end of the bar to extract it from its stored position fully telescoped in the channel to the operating position shown in the drawings. By slightly lifting the bar to disengage the notch 206 from the lip 204 it may be pushed into the channel for storage with only the ring projecting through the open end 201. The bar would be kept thus stored so as not to interfere with the door 68 during compacting movements of the platen.

A sling in the form of a flexible cable C having loops L and L' at opposite ends is threaded through the wire slots 31', 90' and 124' in the bed and back wall of the chamber and the press platen respectively which, it will be noted, are substantially on the transverse centerline of the bale B though offset slightly to the right as viewed in FIGS. 1 and 2. Such slots may be so arranged during construction of the baler that they lie directly on the centerline, or in other words in a plane perpendicular to the front and back sides of the bale and intersecting the center of mass of the bale. If desired to facilitate encirclement of the bale by the cable sling, or balance of the bale when suspended by the cable, the press platen may be raised slightly as the bale is confined by the wires W, and the cable pushed across the top of the bale and positioned at the centerline thereof. Loop L is then inserted through loop L' and over the end of the arm 200 to lie just behind the ring 208 as shown in FIG. 4. The cable sling is then positioned so that loop L' is disposed adjacent the upper front edge 211 of the bale, or spaced slightly down therefrom as shown in FIGS. 1, 3 and 6.

At this point, if desired, a pallet P may be placed on the floor just in front of the baling chamber door opening preparatory to receiving the bale. To remove the bale the operator actuates the baler control circuit (disclosed in said copending application) to cause the ram to raise the platen as shown in FIGS. 2 and 7 with the result that the bale is swung by the sling upwardly and outwardly from the baling chamber and hangs suspended over the pallet in front of the baler as shown in FIG. 7. As the center of mass M of the bale lies in vertical alignment with the cable C and the lower edge 209 of the bale, when the operator reverses the movement of the platen causing descent thereof and rests edge 209 on the pallet as shown in FIG. 8, he may easily push the bale toward the upright position shown in phantom outline in FIG. 8 while at the same time causing the platen to descend further. As the straightening up of the bale is accomplished while its weight is substantially completely carried by the sling C, the operation can be performed easily and safely. Sufficient slack should, of course, be provided in the cable at 214 when it is initially threaded around the bale and connected to the arm, so that when the bale is rested on the pallet in the phantom outline position of FIG. 8, the cable can lay back over the top of the bale.

With the bale resting on the pallet, the cable loop L is unhooked from the arm, the cable sling removed from around the bale, and the bale and pallet removed as by a forklift truck. The arm 200 is pushed back into its stored position in channel 122', the cable C laid aside, the door 68 closed, and the baler is ready for continued operation.

It will be noted that the arm 200 should be long enough so that when the bale is lifted, its center of mass M will cause the bale to swing out of the baling chamber with the lower corner 209 lying outboard of the baling chamber as shown in FIGS. 7 and 8. Also, by virtue of the arm being offset somewhat to the left of the transverse centerline of the baling chamber as viewed in FIGS. 1 and 2, the bale swings to the left and away from wall 64 so that it is completely clear of the chamber thereby facilitating setting it upright on the pallet spaced from the door 68 and the hinges 70.

What is claimed is:

1. The method of removing a formed bale from a baler having a baling chamber and a vertically reciprocable press platen for compacting material to be baled in the chamber comprising the steps of:
    connecting the formed bale while in the chamber to the press platen for suspension of the bale therefrom,
    raising the platen to lift and suspend the bale free of the bed of the baling chamber,
    shifting the bale while suspended from the platen outwardly through an open side of the chamber to a position disposed with the center of mass of the bale outside the chamber,
    lowering the platen to rest the bale on a support outside the chamber, and
    releasing the connection of the platen and bale.

2. The method defined by claim 1 in that the step of connecting the formed bale to the platen is characterized by a connection disposed outwardly beyond the open side of the baling chamber.

3. The method defined by claim 1 further characterized by connecting the bale to the platen for suspension outwardly laterally of the baling chamber, raising the platen to suspend the bale free of the chamber bed and allowing the bale to swing laterally outwardly of the chamber through an open side thereof.

4. The method of removing a formed bale from a baler having a baling chamber open at one side and a vertically reciprocable press platen for compacting material to be baled in the chamber comprising the steps of:
    encircling the bale while in the chamber with a lifting sling,
    connecting the sling to the press platen at a point disposed laterally outwardly of the chamber beyond the open side thereof,
    raising the platen to suspend the bale free of the bed of the chamber,
    swinging the bale thus suspended through the open side of the chamber to position its center of mass over a support outside of the chamber, and lowering the platen to rest the bale on the support outside the chamber.

5. Apparatus for removing a formed bale from a baler having a baling chamber with a bale removing opening at least at one side thereof and a vertically reciprocable press platen movable into and out of the chamber through the top thereof for compacting material in the chamber, comprising:
 a bale lifting member mountable on the press platen to project laterally thereof over and beyond the opening, and
 a sling for encircling a formed bale in the chamber and connection to said member.

6. Bale removing apparatus for removing a formed bale from a baler having a baling chamber with a bale removing opening at one side thereof and a vertically reciprocable press platen movable into and out of the chamber through the top thereof, comprising:
 bale lifting means mounted on the press platen for shiftable movement from a stored position disposed within the perimeter of the platen to an operable position extending laterally beyond the perimeter and over and beyond the bale removing opening of the chamber, and
 bale engaging and suspending means for connecting a formed bale in the chamber to the bale lifting means on the press platen and swinging a bale suspended therefrom upon elevation of the platen outwardly through the bale removing opening of the baling chamber.

7. In combination with a vertically shiftable press platen of a baler, a bale lifting arm for projection laterally of the platen beyond an edge thereof, means for supporting the arm for shiftable movement between a stored position and an operable position projecting beyond the platen as aforesaid, and a sling connected to said arm and having a length for encircling a formed bale in the chamber.

8. A self ejecting baler comprising:
 a baling chamber open at the top and having a side opening bale removing door,
 a press platen for vertical reciprocation through the open top of the chamber,
 power means for vertically shifting the platen,
 a bale lifting arm,
 means for mounting the arm on the platen to project laterally beyond the same and over the side opening of the chamber when said door is open, and
 sling means connected to the end of said arm for encircling and suspending the bale therefrom upon elevation of the platen.

9. The invention defined in claim 8 characterized in that said bale lifting arm is supported for movement between an operable position extending laterally beyond the platen and over the side opening of the chamber when the door is open and a stored retracted position disposed within the perimeter of the platen to permit vertical reciprocation thereof when the door is closed.

10. The invention defined in claim 9 further characterized in that said platen includes a hollow channel member opening toward that edge of the platen adjacent the side opening door of the baling chamber, and said lifting arm is telescoped in said channel member for extension therefrom to said operable position or retraction thereinto to said stored position, and means are provided for selectively holding said arm in said operable and stored positions.

* * * * *